United States Patent [19]

Hirota et al.

[11] Patent Number: 4,839,719
[45] Date of Patent: Jun. 13, 1989

[54] COLOR IMAGE READING APPARATUS WITH AN IMPROVED SENSOR

[75] Inventors: Yoshihiko Hirota; Masamichi Kishi, both of Osaka, Japan

[73] Assignee: Minolta Camera Kabushiki Kaisha, Osaka, Japan

[21] Appl. No.: 150,382

[22] Filed: Jan. 29, 1988

[30] Foreign Application Priority Data

Jan. 30, 1987 [JP] Japan .................................. 62-21583
Jan. 30, 1987 [JP] Japan .................................. 62-21584
Jan. 30, 1987 [JP] Japan .................................. 62-21585

[51] Int. Cl.⁴ ............................................. H04N 1/46
[52] U.S. Cl. .......................................... 38/75; 358/80
[58] Field of Search ................................... 358/75, 80

[56] References Cited

U.S. PATENT DOCUMENTS

| 4,511,989 | 4/1985 | Sakamoto | 358/75 X |
| 4,589,035 | 5/1986 | Yamanishi et al. | 358/285 X |
| 4,679,074 | 7/1987 | Sugiura et al. | 358/75 X |
| 4,691,114 | 9/1987 | Hasegawa et al. | 358/293 X |
| 4,734,760 | 3/1988 | Futaki | 358/75 |

FOREIGN PATENT DOCUMENTS

| 0107506 | 5/1984 | European Pat. Off. | 358/75 |
| 58-56570 | 4/1983 | Japan | 358/75 |
| 58-97961 | 6/1983 | Japan | 358/293 |
| 59-4375 | 1/1984 | Japan | 358/293 |
| 59-86361 | 5/1984 | Japan | 358/75 |
| 59-86362 | 5/1984 | Japan | 358/75 |
| 59-105762 | 6/1984 | Japan | 358/293 |
| 60-170364 | 9/1985 | Japan | 358/75 |

Primary Examiner—James J. Groody
Assistant Examiner—E. Anne Faris
Attorney, Agent, or Firm—Price, Gess & Ubell

[57] ABSTRACT

A color image reading apparatus according to the present invention processes by shifting of a sensor element one by one, output signals from three sensor elements consisting of each one picture element of a one-dimensional image sensor sensing one of three primary colors respectively. The sensor elements read any image so that printing data can be increased apparently up to three times of the picture element density of the sensor. A circuit is provided for thinning out the printing data for assuring adaptability to various printers.

11 Claims, 10 Drawing Sheets

COLOR IMAGE READING APPARATUS WITH AN IMPROVED SENSOR

BACKGROUND OF THE INVENTION

1. Field of the Invention

This invention relates to an image reading apparatus for color images, more particularly to a image reading apparatus using one-dimensional color sensors whose one picture element is comprised by three different sensor elements for sensing three primary colors; red, green and blue which respectively are successfully aligned as one image element in series.

2. Description of the Prior Art

CCD (Charged Coupled Device) one-dimensional image sensors, which are aligned in series in order to sense, for example, the three primary colors; red, green and blue are well known as a color sensor to be used in reading apparatus for color images. Such color sensors contain respective red (R), green (G) and blue (B) filters which are aligned adjacently each picture element by vapor deposition and other techniques, so that fundamentally the data are outputted serially in the order of R→G→B, while the data comprising a set of R, G and B are converted through a color conversion processing into respective data for the three primary colors for printing.

In such a conventional color conversion method, however, the density of image reading is equal to the picture element density of the sensor, in other words, the density of image reading can not be increased over the picture element density, for example 16 per 1 mm in general.

In the prior art therefore, the read image data are processed electrically in order to generate the picture elements and consequently improve the picture element density, resulting in problems such as a need for complicated software processings and longer processing time.

SUMMARY OF THE INVENTION

In order to solve the problems described hereinbefore, an object of this invention is to provide a novel image reading apparatus for color images, which realizes the image reading with fine pitch up to three times of the picture element density of the sensor through a hardware configuration only.

Another object of this invention is to provide an image reading apparatus for color images, which can read images with variable pitches multiplied by 3, 2 or 1 to the picture element density of the sensor, according to the capacity of a printer to be used.

A still further object of this invention is to provide an image reading apparatus for color images, which comprises comparatively cheap hardware for realizing the proceeding objects.

This invention is principally based on the fact that one picture element of the color image reading apparatus consist of each one of three different sensor elements corresponding to the three primary colors respectively, namely, this invention applies a technique which increase the apparent picture element number three times to the actual image element number by shifting by one sensor element and duplicating of three different sensor elements which are aligned one-dimensionally and repeatedly in the same order without fixing any picture element to any set of three specified sensor elements.

The above and further objects and features of the invention will more fully be apparent from the following detailed description with accompanying drawings.

DESCRIPTION OF THE PREFERRED EMBODIMENTS

The color image reading apparatus according to this invention will be hereinafter described in detail with reference to the drawings showing the preferred embodiment.

Figure 1:
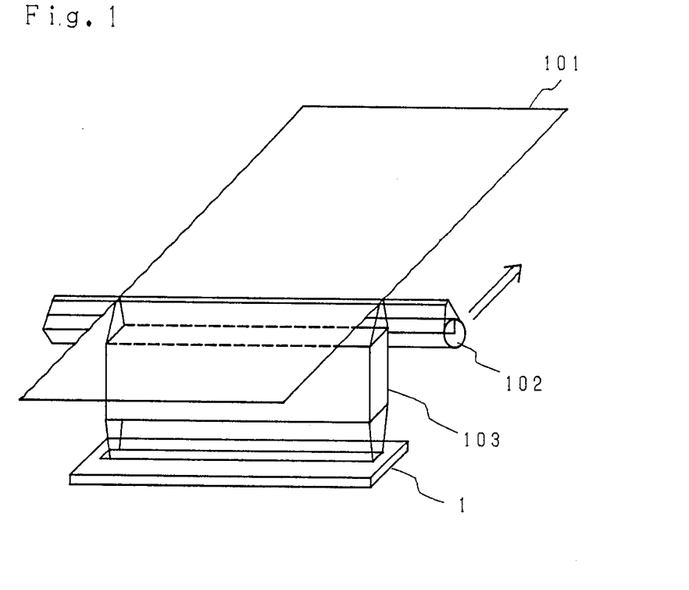
FIG. 1 shows a construction of a scanning system of a general color image reading apparatus.
Figure 2:
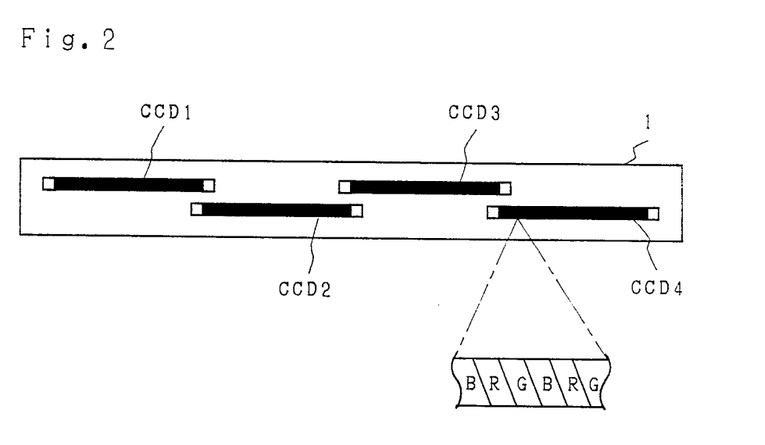
FIG. 2 shows a schematic diagram of an arrangement of CCD sensor arrays of the one-dimensional image sensor used in the scanning system of FIG. 1.
Figure 3:
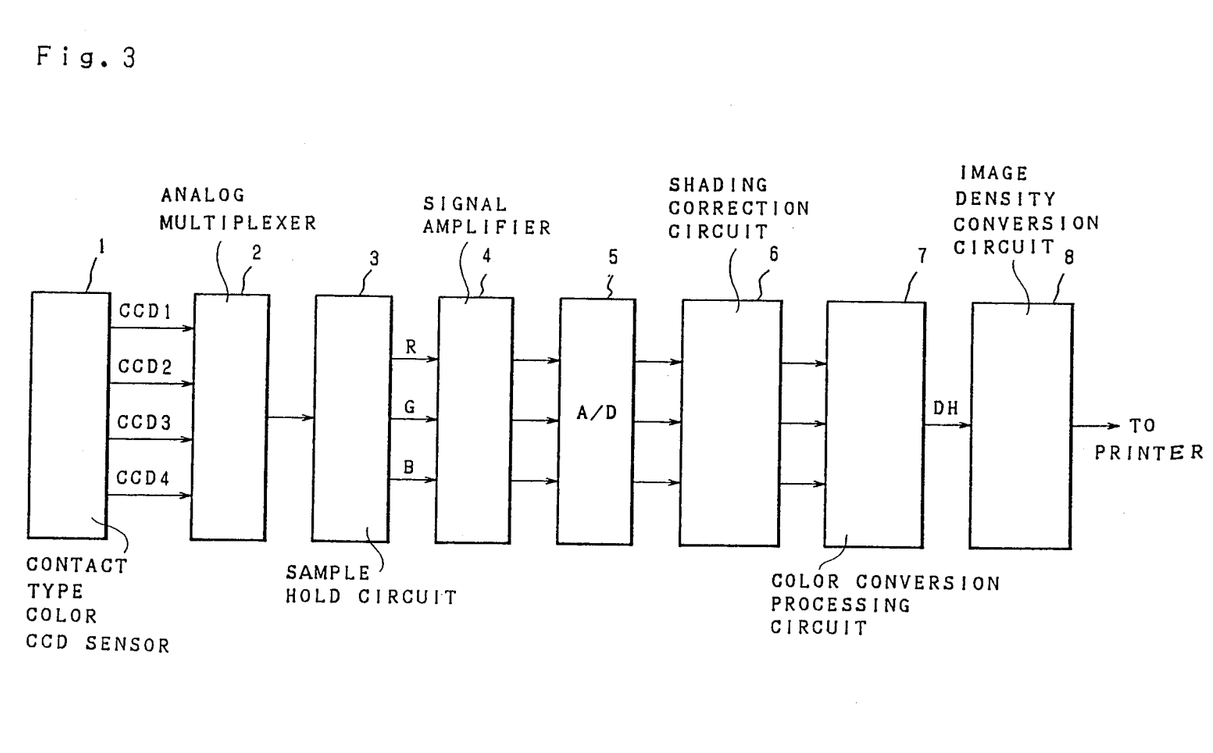
FIG. 3 is a block diagram showing the whole configuration of a signal processing system in the color image reading apparatus.

FIG. 1 shows the construction of a well known scanning system for color image reading apparatus and FIG. 2 shows the CCD array pattern of the one-dimensional CCD image sensor thereof, while FIG. 3 is a block diagram showing the entire configuration of a processing circuit for signals being read by the color sensor 1.

The original 101 is irradiated by the light source (a fluorescent lamp) 102 and the reflected light is transmitted through the lens array 103 to the one-dimensional CCD color image sensor (hereinafter referred to simply as "color sensor") 1, sensed as the image information and converted into corresponding electric signals.

In the color sensor 1 with the array pattern thereof as shown in FIG. 2, four CCD sensor arrays; CCD1 through CCD4 are aligned with a slight shift in the direction perpendicular to the alignment line of respective sensor elements and combined together so as to make a sensor unit as a whole.

Within each picture element of the respective sensor arrays; CCD1 through CCD4, as shown in the magnified sketch of FIG. 1, the filters; R (red), G (green) and B (blue) are vapor-deposited as separate sensor elements in the alignment direction of the picture elements.

Moreover, respective sensor elements have the form of a parallelogram instead of quadrate in order to prevent occurrence of moiré patterns.

Therefore, the respective sensor arrays CCD1 through CCD4 output the signals; R, G and B successively and repeatedly, which are then transmitted to the analog multiplexer 2, which is a means for connecting four CCD sensor arrays; CCD1 through CCD4 selectively with a sample hold circuit 3 so that the respective sensor arrays can operate as if they were one sensor unit as a whole.

The sample hold circuit 3 performs a color analysis to the signals; R, G and B, while succeeding signal amplifier 4 executes a differential amplification of black level under sensitivity correction of the signals; R, G and B. The amplified signals are converted respectively through an A/D converter 5 into digital values of 8 bits and transmitted to a color conversion processing circuit 7 after shading correction by the shading correction circuit 6.

The color conversion processing circuit 7 converts respective data of the shading-corrected and sensed image signals; R, G and B into C (cyan), M (magenta) and Y (yellow) for printing out by a printer and others. The color conversion processing is represented by the following equation;

$$\text{Data to be printed out} = r \cdot R + g \cdot G + b \cdot B \quad (1)$$

where r, g and b are predetermined constants depending upon respective data of C, M and Y, therefore, the equation (1) can be rewritten as the following determinant (2);

$$\begin{pmatrix} C \\ M \\ Y \end{pmatrix} = \begin{pmatrix} r_1, g_1, b_1 \\ r_2, g_2, b_2 \\ r_3, g_3, b_3 \end{pmatrix} \begin{pmatrix} R \\ G \\ B \end{pmatrix} \quad (2)$$

where $r_{1-3}$, $g_{1-3}$ and $b_{1-3}$ are constants respectively. Namely, the respective constants r, g and b are multiplied with the sensed image data R, G and B and then the data r·R, g·G, and b·B are summed up in the color conversion processing.

Figure 4:
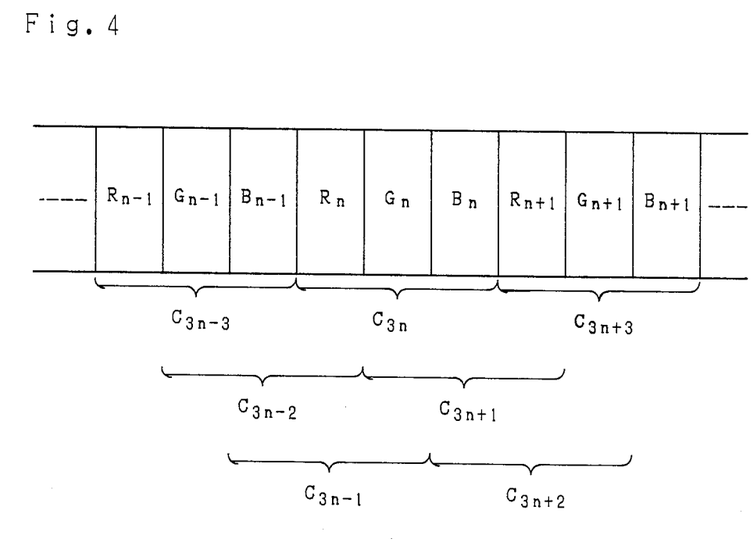
FIG. 4 is a schematic diagram showing a relation of the sensor elements constructing the respective picture elements of the color sensor with the respective picture elements during printout.

As described hereinafter in the color image reading apparatus according to this invention, the density of the color picture elements can be increased up to three times by summing up between the adjacent picture elements. As shown in FIG. 4, three types of sensor elements; $R_n$, $G_n$ and $B_n$ are aligned successively for the n-th picture element of the sensor. If it is supposed that the value ($C_{3n}$) of the 3n-th C is calculated from the data ($R_n$, $G_n$, $B_n$) of the n-th picture element in the following equation;

$$C_{3n} = r_1 \cdot R_n + g_1 \cdot G_n + b_1 \cdot B_n \quad (3)$$

the value ($C_{3n+1}$) of the 3n+1-th C is obtained from the data of the adjacent picture elements, namely, $G_n$, $B_n$ and $R_{n+1}$ are considered as another picture element, therefore, $$C_{3n+1} = r_1 \cdot R_{n+1} + g_1 \cdot G_n + b_1 \cdot B_n \quad (4)$$

Furthermore, the value ($C_{3n+2}$) of the 3i+2-th C is obtained from the data of the corresponding adjacent picture elements, namely, $B_n$, $R_{n+1}$ and $G_{n+1}$ are considered as another picture element again.

$$C_{3n+2} = r_1 \cdot R_{n+1} + g_1 \cdot G_{n+1} + b_1 \cdot B_n \quad (5)$$

The color conversion processing for M and Y are carried out in the same manner.

As described hereinbefore, the color conversion processing is not executed once for respective sensor elements of the picture element, but repeated three times with the data of the adjacent picture elements, resulting in the picture element density equal to three times the sensing density.

Figure 5:
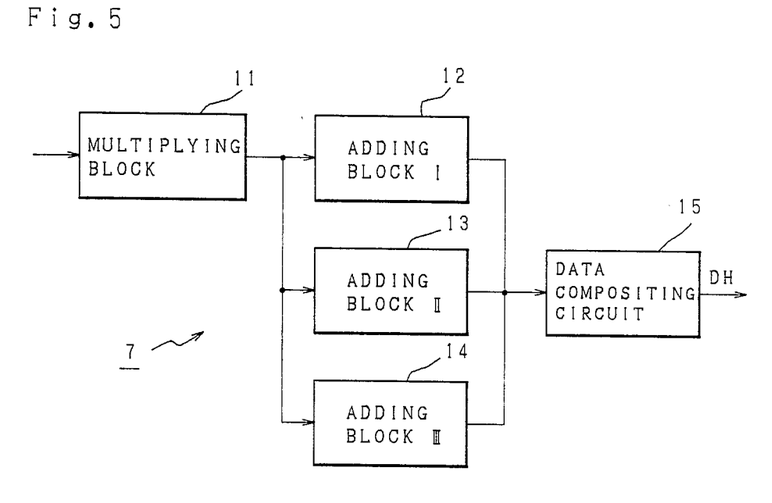
FIG. 5 is a block diagram showing construction of a color conversion processing circuit.
Figure 7:
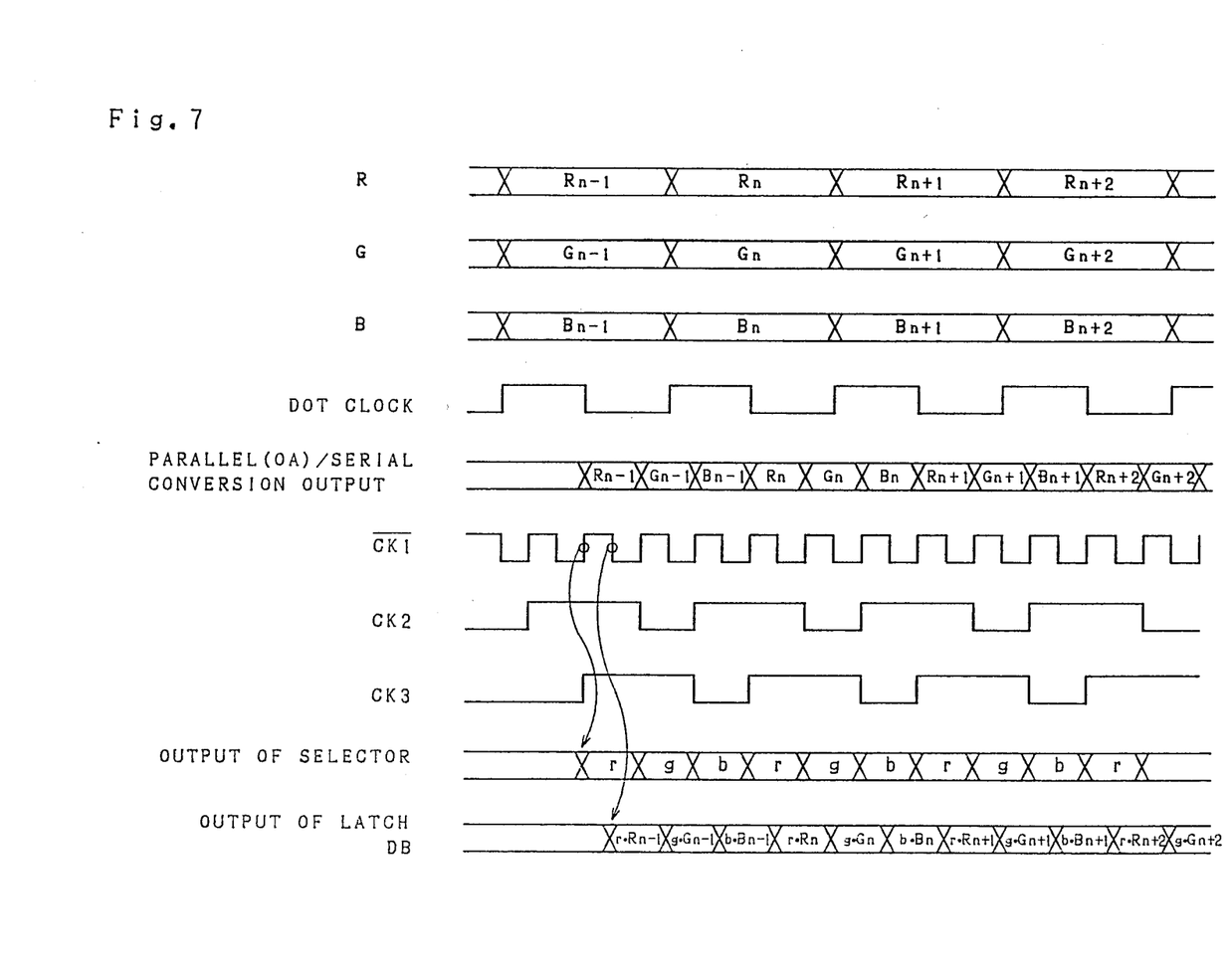
FIG. 7 is a timing chart explaining the operation of the multiplying block.

FIG. 5 shows a block diagram of a color operation circuit 7, where the multiplying block 11 is a block for multiplication of r·R etc. and the results are transmitted successively to three adding blocks I, II and III (12, 13 and 14) from which the respective added values are transmitted respectively to the data compositing circuit 15, the functions of this circuit will be described in the timing chart thereof (FIG. 7).

Figure 6:
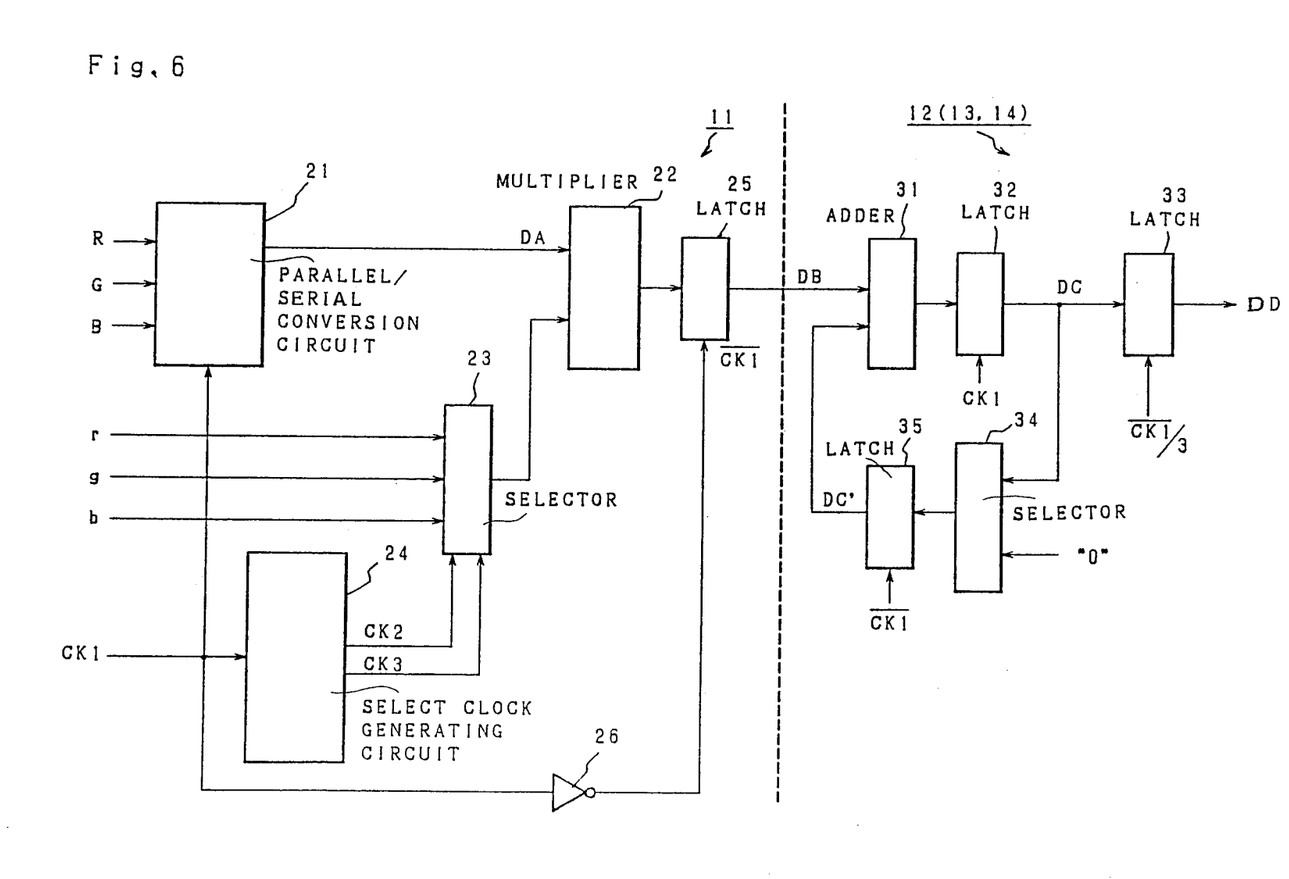
FIG. 6 is a block diagram giving a detailed construction containing a multiplying block and an adding block.

FIG. 6 is a block diagram showing a detailed construction of the multiplying block 11 and an adding block, for example, 12, while two remaining adding blocks with the perfectly same construction are not shown for the purpose of simplification.

As shown in the flow chart of FIG. 7, respective data (digital data of 8 bits) of input picture element data R, G and B sensed by the color sensor 1 in the multiplying block 11 are transmitted in serial form by a parallel-/serial conversion circuit 21 and then transmitted as the data DA serially to an multiplier 22 in the order of R, G and B and in synchronization with the rise of clock CK1 equal to three times of the dot clock, while a selector 23 selects one among three constants r, g, b (for example, $r_1$, $g_1$, $b_1$ in operation of C) and transmits the selected constant to the multiplier 22. The aforesaid selection is executed in synchronization with the rise of constant select clocks CK2 and CK3 generated by a select clock generating circuit 24.

Thus, the synchronized data r and R, g and G, and b and B are inputted into the multiplier 22, which executes the multiplications r·R, g·G and b·B successively and transmits these multiplied values through a latch circuit 25 to the adding blocks 12, 13 and 14 in synchronization with the clock CK1 inverted by an inverter 26.

The selector 34 in the adding blocks 12, 13 and 14 clears to "zero" the added data DC, which has been processed by an adder 31 and a latch 32, periodically (once for three operations). The data from a selector 34 is latched by a latch 35 and transmitted as the data DC' to the adder 31 in synchronization with the output DB from the multiplying block 11. The adder 31 executes the addition of the data DB and the feed back data DC' and outputs the added data DD through the latches 32, 33 in response to the clock $\overline{CK1}/3$.

The output DC of the latch 32 is cleared periodically by a selector 34, and is latched by a latch 33 in synchronization with the clearing timing in order to execute the operation as expressed by the equation (1), namely, the adding blocks 12, 13 and 14 output the data r·R+g·G+b·B only to the succeeding processing block while the additions r·R+0, r·R+g·G, and r·R+g·G+b·B are executed.

As shown in FIG. 5, the adding blocks on right side of FIG. 6 are actually connected in parallel, however, operation differences of respective adder blocks are limited to timings of "0" selection by the selector 34 and the latching by a latch 35 which takes place simultaneously therewith. Namely, the selector 34 in the adding blocks I, II and III, as shown in the timing chart of FIG. 8, periodically clears to "zero" the output data DC from the adder 31, however, the respective blocks I, II and III have different timings of the "zero" clearing (refer to corresponding DC's) and the latch 33 of the respective blocks latches the data DC in synchronization with the timing of "zero" clearing in the selector 34 (refer to DD of FIG. 8).

Figure 8:
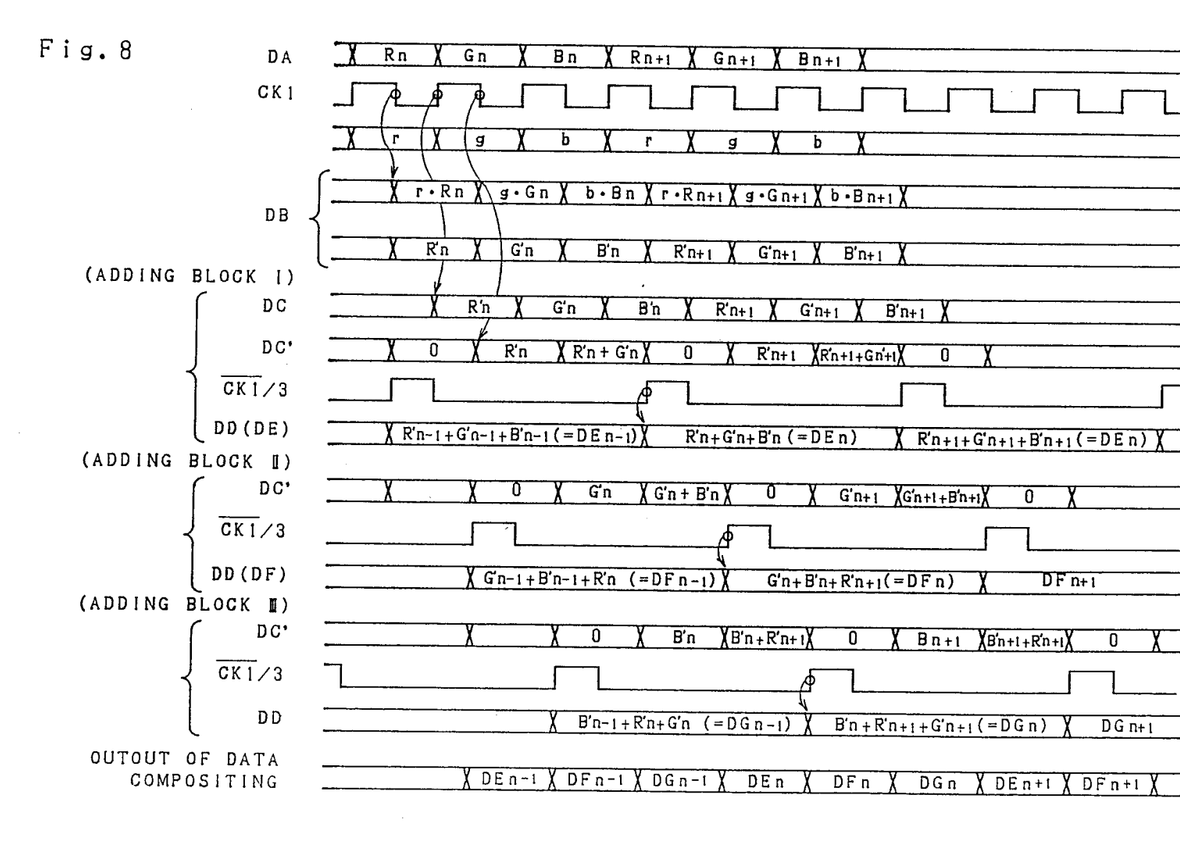
FIG. 8 is another timing chart explaining the operation of the adding block.

Therefore, if the image data r·$R_n$, g·$G_n$ and b·$B_n$ outputted from the adding blocks are simply represented by $R'_n$, $G'_n$ and $B'_n$, the adding block I outputs $R'_n + G'_n + B'_n$ and the adding block II outputs $R'_{n+1} + G'_n + B'_n$, while the adding block III outputs $R'_{n+1} + G'_{n+1} + G'_n$, resulting in the tripled picture element density.

If it is supposed that the outputs of the respective blocks I, II, III are $DE_n$, $DF_n$ and $DG_n$, the data compositing circuit 15 of FIG. 5 transmits the outputs of the respective blocks to a printer after successive parallel/serial conversion thereof in the order of the $DE_n$, $DF_n$ and $DG_n$. Thus, the data equal to three times the read picture element density are outputted during the conversion thereof into printing data C, M or Y in the color conversion processing circuit 7.

The image reading apparatus for obtaining color information of the original copy to be converted into printing data repeats scannings of the respective printing data C, M and Y in the same scanning line, three times in total.

The output data DH of the color conversion circuit 7 is then converted into the picture element density corresponding to the printing dot density of the output side, i.e., the printer side and transmitted to the printer.

Figure 9:
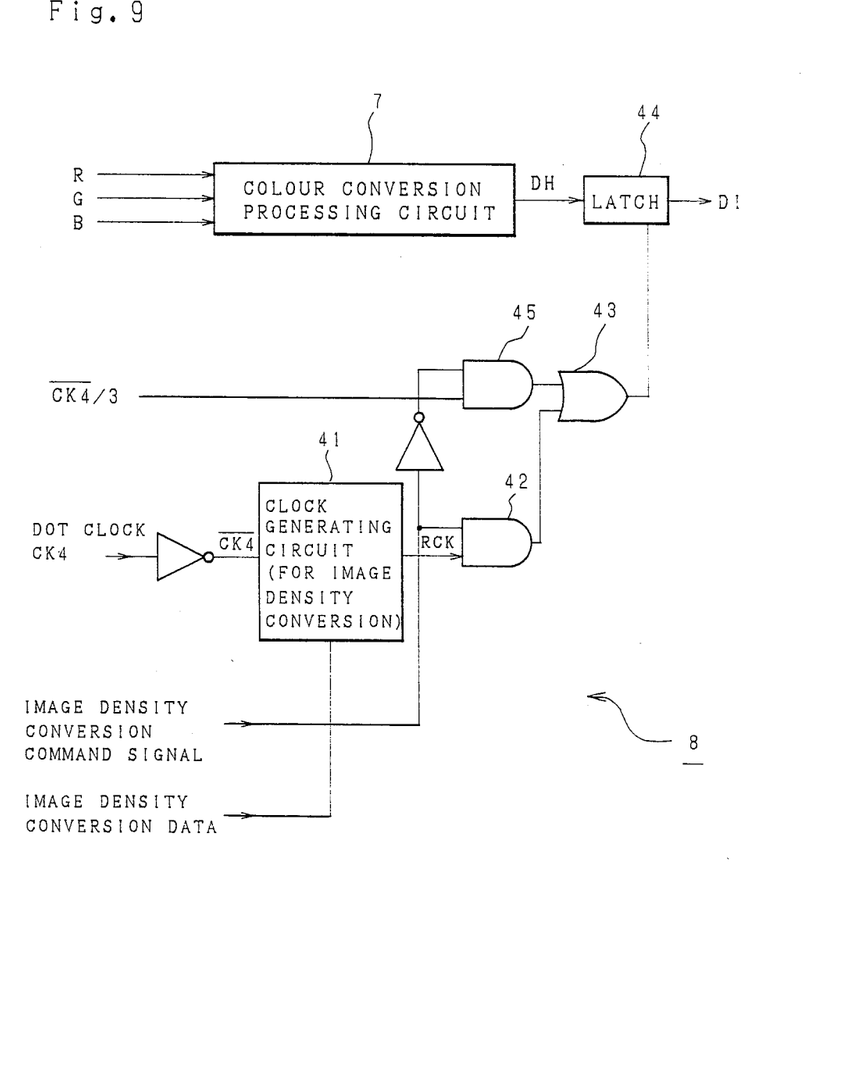
FIG. 9 is a block diagram showing construction of an image density conversion circuit.
Figure 10:
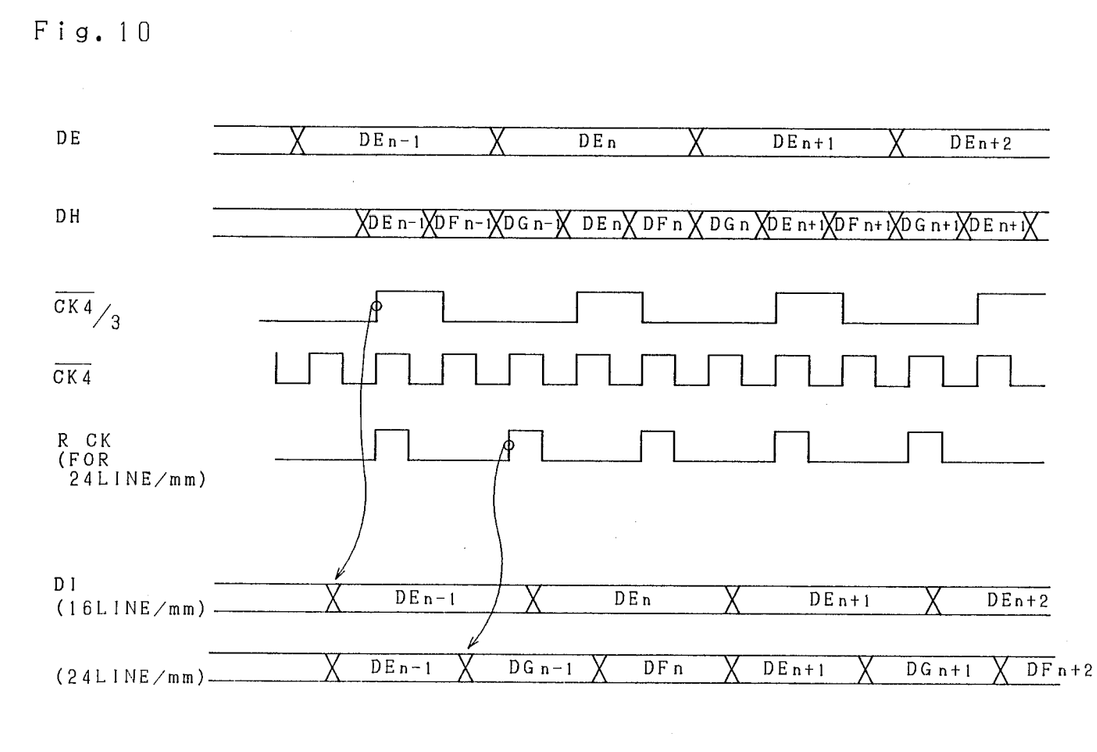
FIG. 10 is a timing chart explaining the operation thereof.

FIG. 9 is a block diagram of an image density conversion circuit 8 while FIG. 10 shows a timing chart of the operation thereof.

This circuit 8 is applied for converting the picture element density in the main scanning direction, i.e., picture element alignment direction of the color sensor 1, while the scanning velocity by the optical system is appropriately changed in the sub scanning direction (the density can be increased when the velocity is reduced).

If the reading image density of the color sensor 1 is 16 lines/mm, the output DH of the data compositing circuit 15 will have the density of 48 lines/mm; three times the above density. On the other hand, the dot clock CK4 synchronized with the change of DH generates latch clock in a latch circuit 44 through a clock generating circuit 41 for converting image density. An image density conversion data signal is usually preset (for example, 24 lines/mm) according to the printing dot density in output side. The clock generating circuit 41 for image density conversion generates a clock RCK whose frequency is modified from that of the clock $\overline{CK4}$ based on these image density conversion data signals and transmits the clock RCK to an AND gate 42.

An image density conversion command signal is a negative logic signal. When the image density conversion command signal is "L", the clock RCK outputted from the clock generating circuit 41 for image density conversion as the latch clock is transmitted to the latch 44 through the AND gate 42 and the OR gate 43, while when the same is "H", $\overline{CK4}$/3 as the latch clock is transmitted to the latch circuit 44 through the AND gate 45 and the OR gate 43. Therefore, the latch 44 outputs the picture element data equal to or less than 48 lines/mm in response to the image density conversion data according to the printing dot number if the output side of the image density conversion command signal is "L" and outputs the data of 16 lines/mm equal to the density of the reading picture elements if "H".

Figure 11:
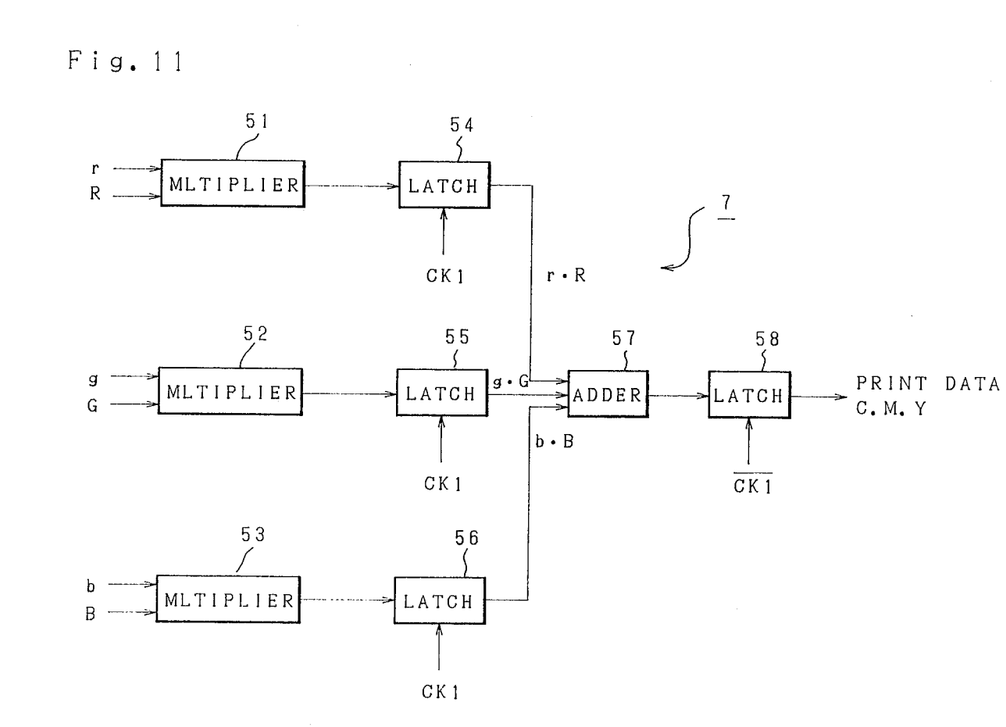
FIG. 11 is a block diagram showing another construction of the color conversion processing circuit.

Moreover, a conventional system as shown in FIG. 11 may be used as the color conversion processing circuit, namely, the color conversion processing circuit 7 can be constructed by three multipliers 51, 52 and 53 and an adder 57.

Figure 12:
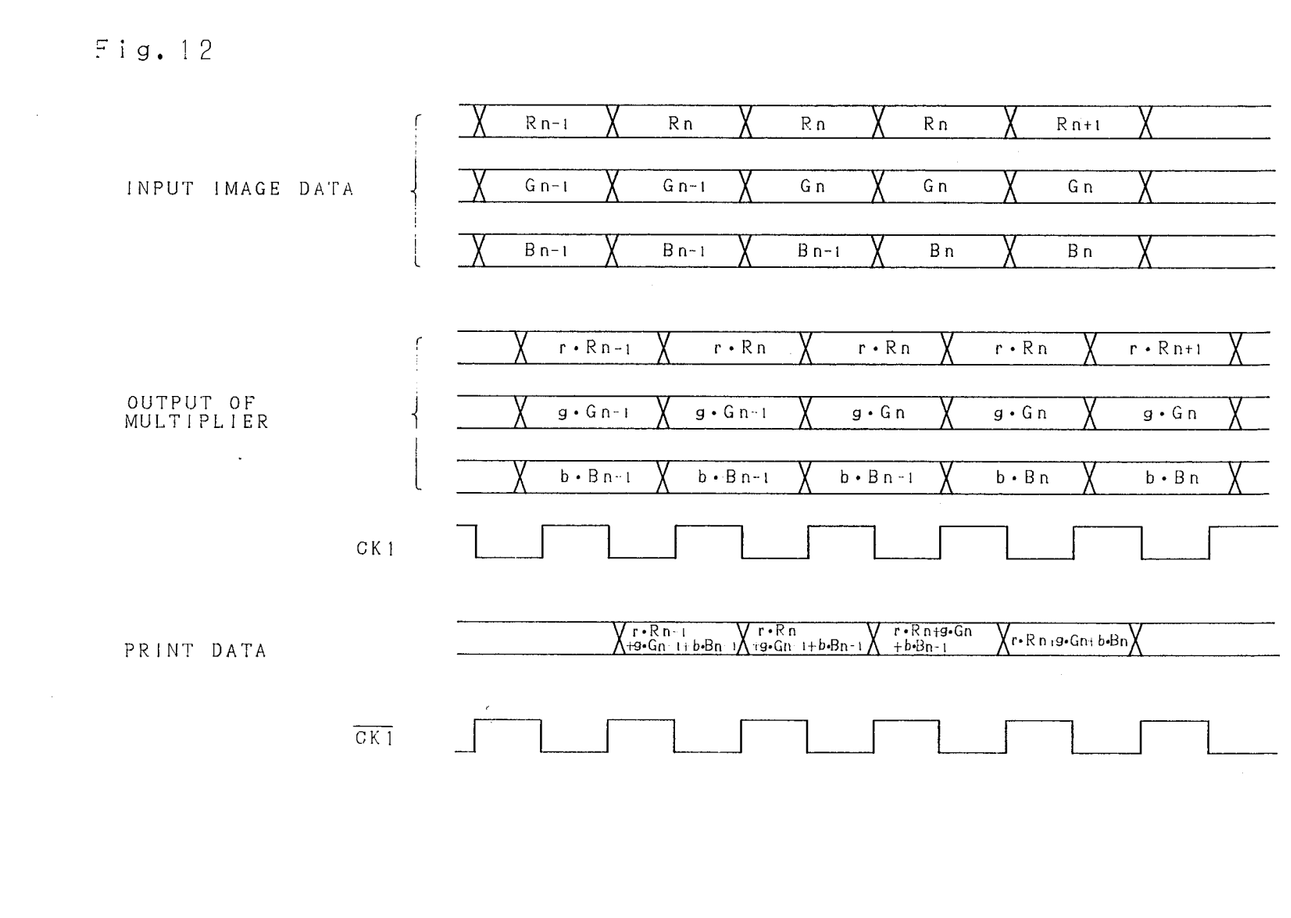
FIG. 12 is a timing chart of the operation thereof.

FIG. 12 gives the timing chart of the above circuit, wherein the multipliers are provided for the respective data R, G and B, the respective operation results are synchronized with the latches 54, 55 and 56, while three data r·R, g·G and b·B are added in parallel by the adder 57 and the operation results are latched with the clocks inverted from latch clocks of the above latches 54, 55 and 56 in order to obtain the printing data C, M or Y. If the data from the adder 57 is latched by a thinned-out clock, variable magnification (electric contraction) may be realized, the data C, M and Y being obtained by three times scannings. This circuit has an cost disadvantage in comparison with the system as shown in FIG. 5 because three considerably expensive multipliers are used.

As described hereinabove in detail, the color image reading apparatus according to this invention can execute image reading with a density up to three times the picture element density of the one-dimensional color sensor without any complicated and relatively time-consuming software processing. It is also allowed to adjust the reading density lower if the capacity of the printer and others is limited.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A color image reading apparatus comprising;
   color sensor arrays including a plurality of sets consisting of three sensor elements for sensing different colors are aligned one-dimensionally in a predetermined order;
   a selecting means for selecting one set of three sensor elements by shifting by one sensor element successively; and
   a color conversion processing circuit having a multiplying portions for multiplying predetermined constants to color signals from a respective sensor element of one set selected by said selecting means, and an adding portion for summing up the multiplication results by said multiplying portions to obtain color data to be printed,
   whereby one color data is obtained for each shift of one sensor element by said selecting means.

2. A color image reading apparatus as set forth in claim 1, wherein said one set of color sensors senses red, green and blue light respectively.

3. A color image reading apparatus as set forth in claim 2, wherein said color conversion processing circuit converts the output signal of said respective sensor elements to cyan, magenta and yellow according to the following equation:

$$\begin{pmatrix} C \\ M \\ Y \end{pmatrix} = \begin{pmatrix} r_1, g_1, b_1 \\ r_2, g_2, b_2 \\ r_2, g_3, b_3 \end{pmatrix} \begin{pmatrix} R \\ G \\ B \end{pmatrix}$$

wherein $r_1$, $r_2$, $r_3$; $g_1$, $g_2$, $g_3$ and $b_1$, $b_2$, $b_3$ are conversion coefficients, respectively, and C is cyan, M is magenta, Y is yellow, R is red, G is green and B is blue.

4. A color image reading apparatus as set forth in claim 3, wherein said color conversion processing circuit processes each of the three primary colors respectively.

5. A color image reading apparatus comprising:
color sensor arrays, including a plurality of sets consisting of three sensor elements for sensing different colors are aligned one-dimensionally in a predetermined order;
a selecting means for selecting one set of three sensor elements by shifting by one sensor element successively;
a color conversion processing circuit having a multiplying portion for multiplying predetermined constants to color signals from a respective sensor element of one set selected by said selecting means, and an adding portion for summing up the multiplication results by said multiplying portions to obtain color data to be printed; and
a magnification varying means for thinning out data outputted from said color conversion processing circuit according to a thinned-out clock to thereby vary a magnification of the data to be printed.

6. A color image reading apparatus as set forth in claim 5, wherein said one set of color sensors senses three primary colors red, green and blue light respectively.

7. A color image reading apparatus as set forth in claim 6, wherein said color conversion processing circuit converts the output signal of said respective sensor elements to cyan, magenta and yellow according to the following equation:

$$\begin{pmatrix} C \\ M \\ Y \end{pmatrix} = \begin{pmatrix} r_1, g_1, b_1 \\ r_2, g_2, b_2 \\ r_2, g_3, b_3 \end{pmatrix} \begin{pmatrix} R \\ G \\ B \end{pmatrix}$$

wherein $r_1$, $r_2$, $r_3$; $g_1$, $g_2$, $g_3$ and $b_1$, $b_2$, $b_3$ are conversion coefficients, respectively, wherein C is cyan, M is magenta, Y is yellow, R is red, G is green and B is blue.

8. A color image reading apparatus as set forth in claim 7, wherein said color conversion processing circuit processes each of the three primary colors respectively.

9. A color image reading apparatus comprising;
color sensor arrays including a plurality of sets consisting of three sensor elements for sensing different colors are aligned one-dimensionally in a predetermined order;
a multiplying means for multiplying predetermined coefficients to color signals of respective sensor elements serially outputted from said color sensor array;
three adding means which are connected in parallel with said multiplying means and add respectively the multiplication results of said multiplying means to the addition results of the preceding step;
an adding control means which clears the addition results of each adding means with a different timing by one output timing of an adding result at each adding means at each finishing of three times addition; and
a compositing means, which outputs three data with respect to one picture element consisting of three sensor elements of said color sensor array by successively outputting the output signal of said respective adding means at the time when each is cleared.

10. A color image reading apparatus as set forth in claim 9, wherein said multiplying means comprises a multiplier and a selector which selectively gives predetermined coefficients to be multiplied to output signals of respective sensor elements as the input to said multiplier.

11. A color image reading apparatus as set forth in claim 9, wherein said adding control means comprises a selector connected in a feedback line extended between the output and input terminals of said adder in order to add the preceding addition result to the multiplication result of said multiplier, and selectively outputs additional results of said adding means with the selector data indicating zero.

* * * * *